Aug. 11, 1970 J. V. POWERS ET AL 3,523,824

METALLIZATION OF PLASTIC MATERIALS

Filed Dec. 29, 1966

INVENTORS
JOHN V. POWERS
LUBOMYR T. ROMANKIW
BY Charles P. Boberg
ATTORNEY

United States Patent Office 3,523,824
Patented Aug. 11, 1970

3,523,824

METALLIZATION OF PLASTIC MATERIALS

John V. Powers, Shenorock, and Lubomyr T. Romankiw, Millwood, N.Y., assignors to International Business Machines Corporation, Armonk, N.Y., a corporation of New York Filed Dec. 29, 1966, Ser. No. 605,639
Int. Cl. G11b *5/84*
U.S. Cl. 117—239 4 Claims

ABSTRACT OF THE DISCLOSURE

A process for metallizing plastic materials by treating the plastic material with a varnish. The varnish is formed by dissolving a metal compound such as palladium salt in a solvent compatible with the insulating varnish or polyimide used for coating the base object. The varnish is cured and the metal compound is reduced to its catalytic metal so as to form bonding sites on the surface of said base object. Then, additional layers of metal are formed on the plastic material thereby forming a substantially fixed smooth metallic layer on the base material.

This invention relates to methods of metallizing plastic insulating materials, particularly solvent-based plastic materials.

As employed herein, the term "solvent-based plastic material" denotes a plastic material that is dissolved in a liquid vehicle. After its application, the plastic material is hardened to a solid state by a curing operation that may involve a simple drying process at room temperature, or an application of heat to the plastic material, or some other curing method. The term "solvent" includes both aqueous and nonaqueous solvents.

There are many instances where it may be desired to metallize the surface of an insulating material. For example, in fabricating magnetic film memory devices, it is common practice to coat a metal ground plane with a solvent-based plastic material, such as a polyimide varnish, to provide a smooth insulating substrate upon which the magnetic memory films can be deposited. As a first step in the film deposition process, the surface of the insulating layer is metallized; that is to say, it is coated with an adherent metal layer by any of several known deposition techniques. Although the metallization of plastics and other nonconductive materials has been practised in many ways, great difficulty has been experienced heretofore in attempting to deposit adherent metal layers of significant thickness upon very smooth insulating substrates without impairing the smoothness of the substrate surface. When depositing a film of high-remanence magnetic material such as nickel, iron, Permalloy (nickel-iron alloy) or other magnetic alloys such as nickel-cobalt, iron-cobalt or copper-Permalloy upon an insulating substrate, it is especially important that high surface smoothness of the substrate and its superposed metallic layers be preserved in order to prevent undesired anisotropies or other unwanted properties from being introduced into the magnetic film deposited thereon.

Solvent-based plastic materials such as polyimides are especially desirable as insulating substrates because of their high surface smoothness, low linear thermal expansion coefficient and great mechanical strength. Prior methods of metallizing such insulators, such as, for example, immersing the substrate successively in stannous chloride and palladium chloride solutions in order to sensitize and activate the surface of the substrate, have not proved satisfactory when utilized for applying metal layers of relatively great thickness (e.g., 1000 to 2000 A. or more) to such substrates, because the adhesion between the metal and insulating layers usually tends to be poor. Known methods of treating a plastic substrate material in order to improve its adhesion to metal involve a mechanical or chemical roughening action which impairs the surface smoothness of the insulation and thereby renders it unsuitable as a substrate for magnetic films having critical properties. On the other hand, if the substrate surface is left smooth, this severely limits the thickness to which subsequent layers or coatings can be deposited thereon by prior deposition methods without exhibiting a tendency of such layers to peel from the substrate. A coating of such limited thickness may not be very useful. For instance, a metal plating on an insulated base cannot be utilized as an electrode for building up a magnetic film memory array by electrodeposition unless it has a certain minimum thickness.

With the foregoing considerations in mind, it is an object of the present invention to prepare plastic insulating materials having the desirable properties of great mechanical strength, low thermal expansion, and high surface smoothness so that strongly adherent metal films of substantial thickness can be deposited thereon by practical metallizing techniques.

A further object is to prepare plastics of the aforesaid type for receiving strongly adherent metal films of substantial thickness without impairing the normal surface smoothness of such materials.

Another object is to enable solvent-based plastic materials such as polyimides having high strength and high surface smoothness to serve as suitable substrates for magnetic film memory elements.

In accordance with one feature of the invention, a catalytic metal compound such as a palladium salt is dissolved in a solvent compatible with the insulating varnish or polyimide used for coating the base object. Upon drying and curing (removal of the solvent), particles of the catalytic metal salt are formed and are dispersed uniformly throughout the plastic medium and become firmly bonded thereto as the plastic hardens. A typical solvent which may be used is shown in commonly assigned copending application Ser. No. 421,712, filed Dec. 28, 1964, now U.S. Patent 3,370,973. A substantial number of these bonded salt particles are exposed at the surface of the plastic, which attains a high degree of smoothness upon hardening notwithstanding the presence of these exposed particles. The catalyst (e.g., palladium) then is reduced from its salt at the surface of the plastic body by a suitable method which does not impair the smoothness of the plastic surface nor weaken the bond between the catalytic metal and the plastic carrier. This provides the plastic substrate with a thin surface layer of active catalytic sites, thereby preparing it for the subsequent reception of a strongly adherent and very smooth metal layer, which, in accordance with the teachings disclosed hereinafter, is deposited from an electroless plating bath on to the smooth surface of the plastic substrate. A very strong adhesion thereby is established between the electrolessly deposited metal layer and the active metal sites on the substrate surface. This adhesion between the plastic base and its metallic coating or plating is strong enough to secure any superimposed metal layers up to a very substantial thickness (e.g., as high as 100,000 A. or greater).

It should be noted in this regard that the method proposed above differs significantly from certain prior methods in which catalytic agents suspended in inks or other conventional coating solutions are printed or painted upon the surfaces of insulating substrates to condition the same for metallization without endeavoring to achieve an exceptionally smooth plating base. In techniques of this type which have been proposed heretofore, the smoothness of the substrate surface generally has not been regarded as a matter of paramount importance. Consequently, the substrate surface is likely to have microscopic roughness therein caused either by the dried deposit of the catalytic solution coated thereon or by subsequent operations such as etching or abrasion performed upon the surface of the hardened residue in order to expose the requisite catalytic metal sites in sufficient quantity to stimulate a subsequent electroless deposition of a desired plating metal upon the substrate, Such roughness, however minute, is considered undesirable in the type of environment contemplated by the present invention.

While the invention is disclosed herein with particular reference to electroless plating techniques, the broad principle of the invention conceivably could be applied also to other metallizing techniques, such as evaporation and sputtering, where it may be desired to form a reliable bond between a smooth plastic substrate and a metallic layer deposited thereon. The underlying problem which the invention solves is the formation of effective metal-to-plastic bonding sites in a significant concentration upon the surface of an ultra-smooth plastic substrate without impairing the smoothness of the substrate surface.

The foregoing and other objects, features and advantages of the invention will be apparent from the following more particular description of a preferred embodiment of the invention, as illustrated in the accompanying drawings, wherein.

Figure 1:
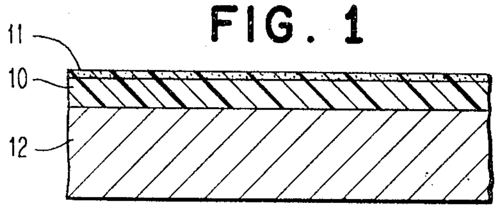
FIGS. 1 to 4 are enlarged sectional views respectively illustrating certain steps in the fabrication of a magnetic film memory structure according to the invention.

The invention makes use of the fact that the salts of catalytic agents such as palladium are soluble either in those solvents which are used in the preparation of insulating varnishes of the type commonly used to coat metallic substrates or in some compatible solvent, such as shown in U.S. Pat. 3,370,973. One type of process in which the invention may be utilized to great advantage is the fabrication of a magnetic film memory by wet-chemical technology. In an illustrative fabrication process of this nature, a metal ground plane 12, FIG. 1, is coated with several insulating layers such as 10 and 11 of strongly adherent, solvent-based, plastic varnish, preferably a polyimide, to provide an insulated substrate of great strength having extremely high surface smoothness. Each insulating layer such as 10 or 11 is applied in accordance with a well-known technique (dipping, spinning or spraying) performed in such a manner as to insure an exceptionally smooth surface on the hardened layer. The uppermost insulating layer 11, in accordance with the present invention, is loaded with a catalytic metal compound such as, for example, nickel hexachloropalladate, $NiPdCl_6$; palladium nitrate, $Pd(NO_3)_2$; palladium trimethylbenzyl ammonium nirite, $(N(CH_3)_3C_6H_5CH_2)_2Pd(NO_2)_4$; or any other of several well-known salts of catalytic metals which are capable of being dissolved in the plastic solvent or a compatible solvent, and subsequently in the plastic material while the same is in its liquid state, before being applied to the substrate. When the layer 11 hardens, it has in its surface numerous exposed particles of the catalytic metal salt which are firmly bonded to the plastic and which do not detract from the surface smoothness of the layer 11. Depending upon the type of plastic used, the various layers thereof may be cured simply by drying them at room temperature, or by the application of additional heat thereto, or by some other curing method.

Figure 2:
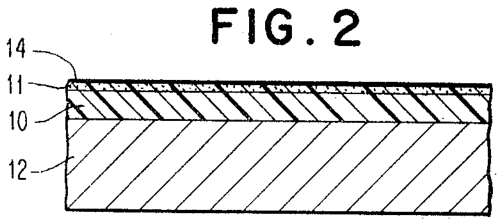

The next step in the process involves the formation of a thin layer 14 of active metal-to-plastic bonding sites at the surface of the plastic layer 11, FIG. 2, this being accomplished by reducing the exposed salt in the layer 11 to its constituent catalytic metal, assumed to be palladium in the present example. The layer 14 need not be an uninterrupted film of metal, but it is important that the catalytic metal particles therein be firmly bonded to the plastic in intimate relation therewith and that these particles do not significantly detract from the smoothness of the exposed surface of the plastic layer 11. This result may be accomplished in any of several ways, such as the following, for instance:

(1) After the plastic layer 11 is cured, the substrate is heated for a short time in an atmosphere of nonoxidizing gas (such as hydrogen or argon) to the thermal decomposition temperature of the palladium compound in the layer 11, causing a partial reduction of the metallic palladium in an exposed layer 14 at the surface of the layer 11.

(2) As an alternative method, the substrate is heat-cured, cooled and dipped in a solution of sodium hypophosphite or other strong reducing agent to form an exposed surface layer 14 of reduced palladium metal without causing any decomposition of the plastic material in the layer 11.

(3) In still another variant, the curing process is carried out in an inert gas or a reducing gas atmosphere, with the curing and reduction occurring simultaneously.

The layer 14 of catalytic metal sites which is thus formed on the surface of the plastic layer 11 is far more strongly and intimately bonded to the plastic material than a catalytic layer that (in accordance with a certain conventional practice) is formed upon the surface of a plastic body which has been roughened by abrasive or corrosive agents to improve the wettability of the plastic and to provide a mechanical interlock with subsequent deposits. The formation of the bonded palladium layer 14 by the present method does not adversely affect the smoothness of the substrate surface. That is to say, a granular or rough texture of the surface (however minute) is avoided. Thus, it is possible to metallize the plastice layer 11 in a manner such as to achieve the contemplated objectives of the invention, one of which is to avoid the undesirable effects of microscopic surface roughnesses upon the properties of subsequent deposits.

Figure 3:
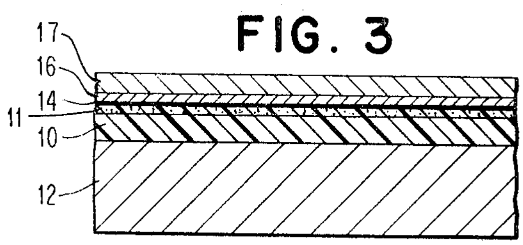

The remaining steps of the metallization process can be accomplished by a well-known electroless deposition technique involving the catalytic reduction of the desired metal or metal alloys from a chemical plating solution to form a metal layer 16, FIG. 3, upon the surface of the plastic layer 11. As an example, the layer 16 may be composed of nickel or copper, both of which are metals that can be deposited through the catalytic action of palladium. When electroless plating is performed as described, the electroless metal layer 16 partakes of the same surface smoothness as the underlying plastic surface. After being electrolessly plated in this fashion, the substrate 12 with its superposed layers 10, 11, 14 and 16 may be heated to a desired curing temperature, as an optional step, in order to insure that the metal coating is free of stress.

Figure 4:
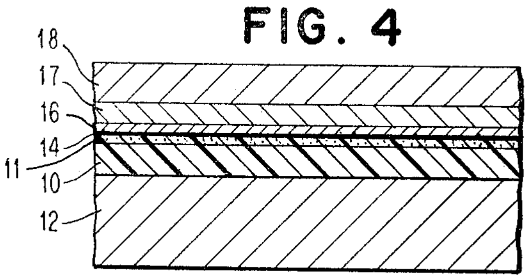

After the plastic 10 has been metallized in this manner, additional metal layers can be deposited thereon in any suitable way. For example, by building the electroless nickel layer 16 to a desired thickness (e.g., 500 A.) and then electroplating an additional layer 17 of copper or other suitable metal thereon, one may provide a conductive metal body of sufficient thickness to serve as an electrode in an electro-plating operation for thereby depositing a layer 18 of a desired magnetic metal such as Permalloy upon the substrate, as indicated in FIG. 4. Where the layer 18 is a magnetic film that is supposed to have a particular induced magnetic orientation, it will be found that this induced orientation is not disturbed by the fact that the underlying substrate is a metallized plastic. Because of the manner in which the plastic layer 11 is metallized, as explained above, its surface smoothness and adhesion properties are not adversely affected by metallization in the present instance. The electroless nickel layer 16 deposited upon layer 11 provides a comparably smooth base for subsequent electroplate deposits.

Figure 5:
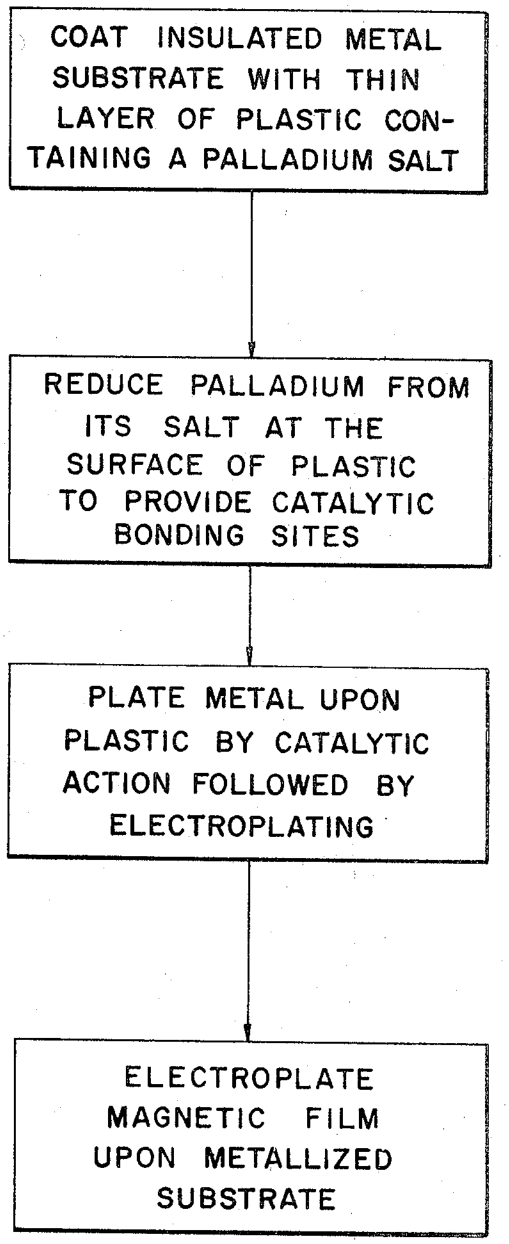
FIG. 5 is a flow diagram of the novel process shown in FIGS. 1–4.

FIG. 5 is a flow diagram depicting the key steps of the process described hereinabove. Using this method, it is easily possible to deposit metal layers such as 18 having thicknesses as great as 100,000 A. or greater upon plastic substrates without encountering any tendency of the metal to peel from the plastic. Where the layer 18 is a magnetic metal as Permalloy, its magnetic properties are free of local anisotropies or other undesirable magnetic effects that may be introduced therein by conventional plating methods which tend to disturb the substrate smoothness and therefore the properties of magnetic films deposited thereon. It is evident, of course, that the invention is not limited to the deposition of magnetic films upon an insulated substrate but may be applied to the metallizing of plastics generally.

While the invention has been particularly shown and described with reference to a preferred embodiment thereof, it will be understood by those skilled in the art that various changes in form and details may be made therein without departing from the spirit and scope of the invention.

What is claimed is:

1. A method of making a magnetic film memory device which includes one or more metallic layers adhering to a smooth-surfaced plastic substrate, said method comprising the steps of:

dissolving in a solvent-based polyimide material a metal compound that is capable of being reduced to its active metal constituent so as to form catalytic metal bonding sites at those places where the active metal constituent appears;

said bonding sites forming catalysts for a further metal plating process;

said metal compound being reduced by a reduction process to which the plastic material is insensitive;

applying a coating layer of said polyimide material containing the aforesaid compound to said substrate to provide said body with a plastic coating of extreme surface smoothness wherein a portion of said metal compound is exposed at the surface of said coating in bonded relationship with the polyimide material;

drying said coating layer;

treating the surface of said polyimide coating to provide exposed metal bonding sites thereon by a noncorrosive and nonabrasive action that preserves the initial smoothness of said coating surface, such treatment involving the reduction of said metallic constituent from its compound at said sites by a reduction process that does not disturb the bond between the reduced metal and said polyimide material;

depositing at least one metal plating selected from the group consisting of nickel and copper upon the smooth surface of said plastic coating in contact with the exposed metal bonding sites, thereby to promote adhesion between said metal plating and said coating, and depositing a magnetic metal layer on said metal plating.

2. A method as set forth in claim 1 wherein the reduced metal is catalytic to the plating material so that said bonding sites can be utilized to stimulate the deposition of the desired plating material upon said surface from an electroless plating bath.

3. A method as set forth in claim 2 wherein said catalytic metal compound is a palladium compound.

4. A method as set forth in claim 1 wherein said reduction process comprises the step of dipping the substrate in a solution of sodium hypophosphite so as to form catalytic metal bonding sites at the surface of said plastic coating.

References Cited

UNITED STATES PATENTS

| | | | |
|---|---|---|---|
| 2,916,393 | 12/1959 | Velonis | 117—71 X |
| 3,226,256 | 12/1965 | Schneble. | |
| 3,370,973 | 2/1968 | Romankiw | 117—71 X |
| 3,014,818 | 12/1961 | Campbell | 117—227 |
| 3,150,939 | 9/1964 | Wenner | 117—239 X |
| 3,171,757 | 3/1965 | Duddy | 117—227 X |

ALFRED L. LEAVITT, Primary Examiner

C. K. WEIFFENBACH, Assistant Examiner

U.S. Cl. X.R.

117—47, 217, 218, 227, 235, 240